United States Patent [19]

Obara

[11] 4,347,424
[45] Aug. 31, 1982

[54] WIRE-CUT, ELECTRIC-DISCHARGE MACHINING POWER SOURCE

[75] Inventor: Haruki Obara, Sagamihara, Japan

[73] Assignee: Fujitsu Fanuc Limited, Tokyo, Japan

[21] Appl. No.: 191,447

[22] Filed: Sep. 29, 1980

[30] Foreign Application Priority Data

Oct. 4, 1979 [JP] Japan .................................. 54-128380

[51] Int. Cl.³ .............................................. B23P 1/02
[52] U.S. Cl. .................................. 219/69 C; 219/69 P
[58] Field of Search ................. 219/69 P, 69 C, 69 W

[56] References Cited

U.S. PATENT DOCUMENTS

| 2,895,080 | 7/1959 | Branker | 219/69 P |
|---|---|---|---|
| 3,054,931 | 9/1962 | Inoue | 219/69 P |
| 3,329,866 | 7/1967 | Webb | 219/69 P |
| 3,357,912 | 12/1967 | Inoue | 219/69 P |
| 3,596,038 | 7/1971 | Hockenberry et al. | 219/69 P |
| 3,832,510 | 8/1974 | Pfau et al. | 219/69 P |

Primary Examiner—C. C. Shaw
Attorney, Agent, or Firm—Staas & Halsey

[57] ABSTRACT

In a power source for a wire-cut, electric-discharge machine, a plurality of capacitors of different capacitances are provided as the discharge capacitors in a transistor-capacitor circuit and the capacitors are selectively used in accordance with the machined surface of the workpiece. Each capacitor has connected thereto an inductor, the inductance value of which increases as the capacitance value of the capacitor decreases, and this action of the inductor ensures stable discharge.

4 Claims, 2 Drawing Figures

WIRE-CUT, ELECTRIC-DISCHARGE MACHINING POWER SOURCE

BACKGROUND OF THE INVENTION

1. Field of the Invention

The present invention relates to a wire-cut, electric-discharge machining power source, and more particularly to a wire-cut, electric-discharge machining power source with which it is possible to perform electric-discharge machining operations at as high a speed as possible from roughing to finishing through utilization of a plurality of capacitors of different capacitances.

2. Description of the Prior Art

Wire-cut, electric-discharge machines are capable of highly accurate machining of a metal molds or the like having complicated configurations through the use of wire electrodes for electric-discharge machining. An example of a power source which has hitherto been employed with such discharge machine is shown in FIG. 1, in which the power source is formed by a transistor-capacitor discharge circuit comprising a power source $V_1$, a charging resistor R, a transistor Tr for control use and a capacitor $C_0$ connected between a wire electrode WIR and a workpiece WK. With such a power source, high-speed cutting of the workpiece WK can be performed by making the capacitance of the capacitor $C_0$ large, the inductance of the discharge circuit small and the voltage of the power source $V_1$ low. In this case, however, the roughness of the machined surface of the workpiece WK is increased by the increased capacitance of the capacitor $C_0$. To avoid this, it is general practice in the prior art to imporve the surface roughness by decreasing the capacitance of the capacitor $C_0$ in the case where a high degree of accuracy is required of the machined surface. But the conventional circuit arrangement of FIG. 1 has the defect that decreasing the capacitance of the capacitor $C_0$ may sometimes result in unstable discharge and extremely lowered cutting speed.

SUMMARY OF THE INVENTION

It is an object of the present invention to provide a power source suitable for use with a wire-cut, electric-discharge machine.

Another object of the present invention is to provide a wire-cut, electric-discharge machining power source which, even in the case of using a small-capacitance discharge capacitor for reducing machined surface roughness, ensures a stable discharge to raise the cutting speed as high as possible.

Yet another object of the present invention is to provide a wire-cut, electric-discharge machining power source which employs a plurality of discharge capacitors of different capacitances so that machining operations from roughing to finishing can be performed at as high a speed as possible.

Briefly stated, the wire-cut, electric-discharge machining power source of the present invention employs a plurality of capacitors of different capacitances as discharge capacitors of a transistor-capacitor discharge circuit. The capacitances of the capacitors are each set to a value suitable for a particular machining operation, for example, rough, medium and finish machining operations. The capacitors each have connected thereto an inductor the value of which increases with a decrease in the capacitance of the capacitor, and this action of the inductance ensures a stable discharge. By operating switches for selectively changing over the discharge capacitors in accordance with the machining operations, machining from roughing to finishing can be achieved at high speed.

DESCRIPTION OF THE PREFERRED EMBODIMENTS

The present invention is based on the confirmation by the present inventor's experiments that in the case of electric-discharge machining using a capacitor of a small capacitance, a relatively large inductance of the discharge circuit and a high power source voltage suppress the possibility of short-circuiting to ensure stable discharge, permitting an increase in the cutting speed without degrading the machined surface roughness, and on the idea that machining operations from roughing to finishing can be performed at the highest possible speed by changing the inductance of the discharge circuit depending on the capacitance of the capacitor in view of the fact that high-speed machining can be achieved by increasing the capacitance of the capacitor and using a low-inductance discharge circuit as mentioned previously.

Figure 1:
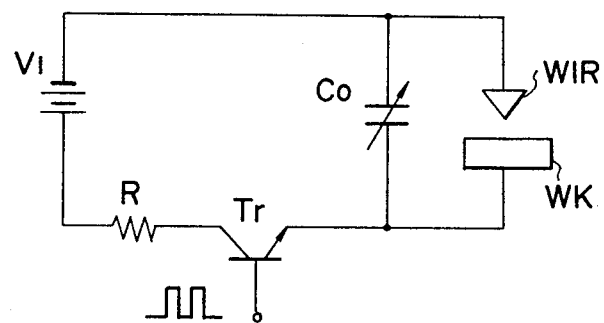
FIG. 1 is an electric circuit diagram illustrating a conventional wire-cut, electric-discharge machining power source.
Figure 2:
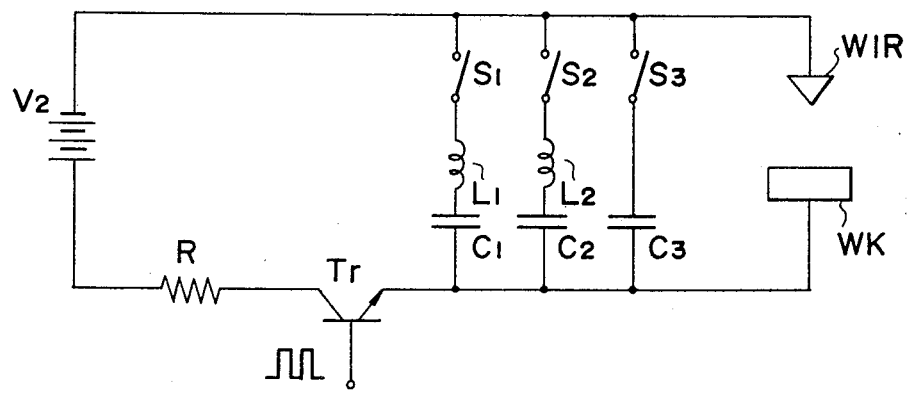
FIG. 2 is an electric circuit diagram illustrating an embodiment of the wire-cut, electric-discharge machining power source of the present invention.

FIG. 2 is an electric circuit diagram illustrating an embodiment of the present invention, in which the parts corresponding to those in FIG. 1 are identified by the same reference characters. In FIG. 2, reference characters $C_1$ to $C_3$ indicate capacitors; $L_1$ and $L_2$ designate inductors; $S_1$ to $S_3$ identify switches; and $V_2$ denotes a power source.

In FIG. 2, the capacitors $C_1$ to $C_3$ are each connected in parallel with the power source $V_2$. The inductor $L_1$ and the switch $S_1$ are connected in series with the capacitor $C_1$, and the inductor $L_2$ and the switch $S_2$ are connected in series with the capacitor $C_2$. No particular inductor is connected to the capacitor $C_3$ since a lead wire or the like has a stray inductance, and only the switch $S_3$ is connected in series with the capacitor $C_3$. The capacitor $C_3$ is provided for rough machining and has the largest capacitance among the capacitors. The capacitor $C_1$ is for finishing and has the smallest capacitance. The capacitor $C_2$ is for medium machining and has a capacitance substantially intermediate between those of the capacitors $C_1$ and $C_2$. The inductors $L_1$ and $L_2$ respectively connected to the capacitors $C_1$ and $C_2$ are provided for increasing the cutting speed, and their inductance values are set so that they may increase as the capacitance values of the capacitors decrease. In this case, the inductance value of the inductor $L_1$ is set to be larger than that of the inductor $L_2$.

As referred to above, it has been confirmed experimentally that in the case of using a capacitor of a small capacitance, a certain increase in the inductance of the discharge circuit suppresses the occurrence of short-circuiting to stabilize the discharge, thereby permitting an increase in the cutting speed. It is assumed that the increase in the inductance causes a decrease in the pulse height of one shot of discharge current to reduce the discharge pressure, imparting no unnecessary vibration to the wire. Furthermore, it has been confirmed experimentally that an excessive increase in the inductance decreases the pulse height of the discharge current to lower the machining performance. Accordingly, there are optimum inductance values of the inductors $L_1$ and $L_2$. For example, in the case where a stray inductance of about 0.3 $\mu$H exists, the capacitor $C_3$ may have a capacitance value of 2 to 3 $\mu$F, and in the case of the capacitor $C_2$ having a capacitance value of 0.1 to 0.5 $\mu$F, it is preferred that the inductance value of the inductor $L_2$ is in the range of 0.4 to 0.7 $\mu$H. Further, it has been confirmed experimentally that in the case of setting the capacitance value of the capacitor $C_1$ in the range of 0.01 to 0.1 $\mu$F, it is preferred that the inductance value of the inductor $L_1$ is 1 to 1.2 $\mu$H or so. Incidentally, when machining was conducted using the capacitor $C_1$ having a capacitance value of 0.08 $\mu$F without the inductor $L_1$, the cutting speed was 60 to 70% lower than that in the case of employing the inductor $L_1$.

With the arrangement described above, when only the switch $S_3$ is closed, the large-capacitance capacitor $C_3$ with no inductor connected thereto is connected in parallel to the power source $V_2$, permitting high-speed rough machining. When closing the switch $S_1$ alone, the series circuit of the capacitor $C_1$ and the inductor $L_1$ is connected in parallel to the power source $V_2$ and finish machining takes place. In this case, since the inductor $L_1$ is connected to the capacitor of small capacitance, the discharge is made stable and a sufficient cutting speed can be maintained. Likewise, when closing the switch $S_2$ alone, the series circuit of the capacitor $C_2$ and the inductor $L_2$ is connected to the power source $V_2$ and medium machining is carried out. In this way, by changing over each capacitor by one of the switches $S_1$ to $S_3$, the inductance of the discharge circuit can be changed depending on the capacitance value of the capacitor, and as a consequence, a substantially sufficient cutting speed can be maintained from rough to finish machining operations.

While in the foregoing embodiment use is made of three capacitors $C_1$ to $C_3$ which are selectively changed over by the switches $S_1$ to $S_3$, the number of capacitors used need not always be limited specifically thereto but may also be selected to be two or more as desired. Also, the switches $S_1$ to $S_3$ can be substituted with one rotary switch.

As will be appreciated from the foregoing description, the present invention is to change the inductance of the discharge circuit depending on the capacitance value of each of the capacitors used, by which a sufficient cutting speed can be maintained over the entire machining operation from rough to finish machining.

It will be apparent that many modifications and variations may be effected without departing from the scope of the novel concepts of this invention.

What is claimed is:

1. An improved wire-cut, electric-discharge machining power source of the type employing a transistor-capacitor discharge circuit, wherein the improvement comprises: a plurality of inductors having different inductance values; a plurality of capacitors of different capacitance values, each capacitor being series-connected to one of the plurality of inductors to form a plurality of capacitor-inductor pairs, the inductance value of the inductor in any capacitor-inductor pair being greater than the inductance value of the inductor in any other capacitor-inductor pair that includes a capacitor having a smaller capacitance value; and switch means for selectively connecting the capacitor-inductor pairs to the transistor-capacitor discharge circuit.

2. A wire-cut, electric-discharge machining power source according to claim 1, wherein the switch means comprises a rough machining switch series-connected to the capacitor-inductor pair that includes the capacitor having the greatest capacitance value.

3. A wire-cut, electric-discharge machining power source according to claim 1, wherein there are three capacitor-inductor pairs, and wherein the switch means comprises a rough machining switch series-connected to the capacitor-inductor pair that includes the capacitor having the highest capacitance value, a medium machining switch series-connected to the capacitor-inductor pair that includes the capacitor having the second highest capacitance value, and a finished machining switch series-connected to the capacitor-inductor pair that includes the capacitor having the smallest capacitance value.

4. A wire-cut, electric-discharge machining power source according to claim 3, wherein the inductor in the capacitor-inductor pair that is series-connected to the rough machining switch is constituted by stray inductance.

* * * * *

UNITED STATES PATENT AND TRADEMARK OFFICE
CERTIFICATE OF CORRECTION

PATENT NO. : 4,347,424
DATED : August 31, 1982
INVENTOR(S) : Obara

It is certified that error appears in the above-identified patent and that said Letters Patent is hereby corrected as shown below:

Col. 1, line 16, delete "a";

Col. 1, line 33, "imporve" should be --improve--.

Signed and Sealed this

Twenty-second Day of February 1983

[SEAL]

Attest:

GERALD J. MOSSINGHOFF

Attesting Officer

Commissioner of Patents and Trademarks